(12) United States Patent
Tsuruga et al.

(10) Patent No.: US 10,240,855 B2
(45) Date of Patent: Mar. 26, 2019

(54) VACUUM INSULATOR, METHOD OF MANUFACTURING THE SAME AND REFRIGERATOR HAVING THE SAME

(71) Applicant: Samsung Electronics Co., Ltd, Gyeonggi-do (KR)

(72) Inventors: Toshimitsu Tsuruga, Kanagawa (JP); Kenji Takeuchi, Kanagawa (JP); Tomokazu Fukuzaki, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 15/444,022

(22) Filed: Feb. 27, 2017

(65) Prior Publication Data

US 2017/0314844 A1  Nov. 2, 2017

(30) Foreign Application Priority Data

Apr. 28, 2016 (JP) .................................. 2016-091732
Sep. 7, 2016 (KR) ......................... 10-2016-0115188

(51) Int. Cl.
*F16L 59/065* (2006.01)
*F25D 23/06* (2006.01)
(Continued)

(52) U.S. Cl.
CPC .......... *F25D 23/065* (2013.01); *F25D 11/022* (2013.01); *F25D 17/042* (2013.01); *F25D 23/066* (2013.01); *F16L 59/065* (2013.01); *F25D 2201/14* (2013.01); *F25D 2317/041* (2013.01); *F25D 2317/0411* (2013.01); *Y10T 428/231* (2015.01)

(58) Field of Classification Search
CPC ..... Y10T 428/231; F16L 59/065; E04B 1/803
See application file for complete search history.

(56) References Cited

U.S. PATENT DOCUMENTS

| 5,408,832 A * | 4/1995 | Boffito ................. F16L 59/065 428/69 |
| 5,505,810 A * | 4/1996 | Kirby ..................... B32B 27/00 156/286 |
| 2014/0178626 A1 | 6/2014 | Min et al. |

FOREIGN PATENT DOCUMENTS

| JP | 61119895 | 6/1986 |
| JP | 2006312947 | 11/2006 |

(Continued)

OTHER PUBLICATIONS

Foreign Communication from Related Counterpart Application; PCT Patent Application No. PCT/KR2017-001631; International Search Report dated Jun. 7, 2017; 4 pages.

*Primary Examiner* — Alexander S Thomas

(57) ABSTRACT

In an insulator including an adsorbent configured to adsorb gas, an initial adsorption performance of the remaining gas inside the insulator using the adsorbent and a long-term adsorption performance of gas introduced into the insulator from the outside are improved so that the short-term performance and the long-term performance of the insulator can be simultaneously improved. An adsorbent that is a first part of an adsorbent included in a vacuum insulator is accommodated in a first space formed with an inside surface of a container, and an adsorbent that is a second part of the adsorbent is dispersed into a second space formed with an inside surface of an outer envelope and an outside surface of the container.

18 Claims, 11 Drawing Sheets

(51) Int. Cl.
 *F25D 11/02* (2006.01)
 *F25D 17/04* (2006.01)

(56) References Cited

FOREIGN PATENT DOCUMENTS

| | | |
|---|---|---|
| JP | 2007155088 A | 6/2007 |
| JP | 2009063033 A | 3/2009 |
| JP | 2010060045 A | 3/2010 |
| JP | 2014113524 | 6/2014 |
| JP | 2014213240 | 11/2014 |
| JP | 2015034571 A | 2/2015 |

* cited by examiner

VACUUM INSULATOR, METHOD OF MANUFACTURING THE SAME AND REFRIGERATOR HAVING THE SAME

CROSS-REFERENCE TO RELATED APPLICATION(S) AND CLAIM OF PRIORITY

The present application is related to and claims the benefit of Japanese Patent Application No. 2016-091732, filed on Apr. 28, 2016 in the Japan Patent Office, and Korean Patent Application No. 10-2016-0115188, filed on Sep. 7, 2016 in the Korean Intellectual Property Office, the disclosure of which is incorporated herein by reference.

TECHNICAL FIELD

Embodiments of the present disclosure relate to a vacuum insulator, a method of manufacturing the same, and a refrigerator having the same.

BACKGROUND

Because, in these days, energy saving of a refrigerator and manufacture of a large-sized refrigerator are globally carried out, it is rapidly progressing to increase the use of a vacuum insulator in the refrigerator regardless of the home and abroad. The vacuum insulator is manufactured by covering a core material having a fine and communicating space inside glass wool or a silica powder, for example, with an outer envelope having a gas barrier property and by decompressing and sealing an inside of the outer envelope.

In order to reduce the thickness of insulation of the refrigerator for the purpose of the large-sized refrigerator, an initial performance of an insulator to be used needs to be improved in terms of acquisition of an energy saving performance. Also, because, due to the reduced thickness of insulation of the refrigerator, dew condensation occurs easily in the surface of the refrigerator in a high-temperature and high-humidity environment, an insulation performance of the vacuum insulator needs to be maintained for a long term so as to prevent dew condensation.

In the vacuum insulator, gas including air or vapor that remains in the vacuum insulator after vacuum discharge is performed, is one factor that causes thermal conduction. In addition, gas is introduced into the vacuum insulator through the outer envelope from the outside so that a degree of vacuum inside the vacuum insulator is deteriorated and the insulation performance of the vacuum insulator is lowered. Thus, an adsorbent is disposed in the vacuum insulator and adsorbs the gas so that the degree of vacuum inside the vacuum insulator is maintained.

In order to improve the performance of the vacuum insulator using the adsorbent, both a configuration of removing an inside gas that remains in the vacuum insulator after vacuum discharge is performed, in early stages and a configuration of removing gas introduced into the vacuum insulator from the outside for a long term are required.

As a configuration of the adsorbent for removing an inside gas that remains in the vacuum insulator in early stages after vacuum discharge is performed. This document discloses that an adsorbent is disposed in the floor of a plurality of insertion holes formed from the surface of a core material at regular intervals so that an adsorption time of moisture and gas components in the core material can be reduced.

In addition, as a configuration of removing gas introduced into the vacuum insulator from the outside for a long term. This document discloses that, in a non-adsorbent gas atmosphere, a zeolite-based adsorbent is hermetically packed in a non-porous sack, a porous hole is formed in the non-porous sack and then vacuum discharge is performed so that a degree of vacuum can be maintained and deterioration of an insulation performance can be prevented.

SUMMARY

However, because, when the adsorbent is disposed in the floor of the plurality of insertion holes, an adsorption time of the adsorbent is reduced such that inactivation of the adsorbent is put forward and thus an adsorption performance cannot be exhibited for a long term.

In addition, when the adsorbent is packed in the non-porous sack and the porous hole is formed in the non-porous sack, a target gas does not exist around the adsorbent that exists in a portion where no porous hole is formed, such that adsorption of the gas is delayed and the adsorption performance cannot be exhibited in early stages.

To address the above-discussed deficiencies, it is a primary object to provide an insulator including an adsorbent that adsorbs gas, whereby an adsorption performance of an inside remnant gas caused by the adsorbent in early stages and an adsorption performance of gas introduced into the insulator from the outside for a long term can be improved and a short-term performance and a long-term performance of the insulator can be simultaneously improved.

Additional aspects of the disclosure will be set forth in part in the description which follows and, in part, will be obvious from the description, or may be learned by practice of the disclosure.

In order to achieve the above objective, in the present disclosure, a first part of a gas adsorbent included in an insulator may be accommodated in a container, and a second part of the gas adsorbent may be dispersed into a space formed with an outer envelope and an outside surface of the container.

That is, according to one aspect of the disclosure, there is provided an insulator including: an outer envelope; a container accommodated in the outer envelope; and an adsorbent that is accommodated in the outer envelope and adsorbs gas, and a first part of the adsorbent may exist in a first space formed with an inside surface of the container, and a second part of the adsorbent may exist in a second space formed with the container and the outer envelope.

According to the present disclosure, because the adsorbent is dispersed into the second space formed with an outside surface of the container, gas included in the insulator may be adsorbed in early stages. Also, because the adsorbent also exists in the first space formed with the inside surface of the container, even when the adsorption performance of the adsorbent in the second space is lowered, due to the adsorption performance of the adsorbent that exists in the first space, the adsorption performance of the adsorbent can be maintained for a long term. Thus, in terms of an insulation performance of the insulator, both a short-term performance and a long-term performance can be improved.

In an exemplary embodiment, the content of the second part of the adsorbent with respect to a total amount of the adsorbent may be five to fifty percent by mass. Thus, adsorption of gas using the adsorbent that exists in the second space is promoted, and the long-term adsorption performance of gas using the adsorbent that exits in the first space is attained so that both the short-term performance and the long-term performance of the insulator can be improved.

In an exemplary embodiment, the container may be formed of a non-woven fabric made of a resin having oxygen gas permeability of 16 g/m²·24 h·atm or less. Thus, the amount of injection of gas into the container may be controlled to be appropriate so that deterioration of the adsorbent that exists in the first space does not easily occur and the long-term adsorption performance of the adsorbent can be improved.

In an exemplary embodiment, the resin may be formed of one selected from the group consisting of polyethylene, polypropylene, and polyethyleneterephthalate, or a mixture thereof. Thus, oxygen gas permeability of the container may be appropriate.

In an exemplary embodiment, the container may include an opening through which the first space and the second space communicate with each other, and the second part of the adsorbent may be dispersed into the second space from at least a part of the opening. Thus, even when the gas adsorption performance of the adsorbent that exits in the second space is lowered, the adsorbent that exists in the first space efficiently adsorbs gas introduced into the insulator from the outside through the opening so that an excellent insulation performance of the insulator can be maintained for a long term.

In an exemplary embodiment, a maximum diameter of the opening may be three to thirty-five mm. Thus, gas introduced into the insulator from an outside of the outer envelope is easily injected into the container so that the long-term performance of the insulator can be improved.

According to another aspect of the present disclosure, there is provided a vacuum insulator that is the insulator, and the outer envelope has a gas barrier property, and an inside of the outer envelope is decompressed. Thus, the insulation performance of the insulator is greatly improved.

In an exemplary embodiment, openings may be respectively formed in two facing facets of the container, and an axis that passes through the two openings may exist. Thus, permeability of the container is improved so that the adsorption performance of gas introduced into the vacuum insulator from the outside of the adsorbent that exists in the first space is improved.

In an exemplary embodiment, the outer envelope may include a discharge port through which vacuum discharge is performed, and the axis may pass through the discharge port. Thus, the remaining gas inside the vacuum insulator can be efficiently adsorbed.

In an exemplary embodiment, a core material may be charged in the second space, and a space in which no core material exists, may be formed around the opening. Thus, the adsorbent disposed in a space near the opening easily comes into contact with gas so that the adsorption performance of the adsorbent that exists in the second space is improved.

The adsorbent may be provided in a powder shape, and an average particle size of the adsorbent may be 0.1 to 500 μm. Thus, an opportunity in which gas and the adsorbent come into contact with each other, is increased so that the adsorption performance of the adsorbent is improved and both the short-term performance and the long-term performance of the vacuum insulator can be improved.

In an exemplary embodiment, the adsorbent may include a moisture adsorbent and a hydrogen adsorbent. Thus, water, vapor, and hydrogen gas that exists in the vacuum insulator or is introduced into the vacuum insulator from the outside can be adsorbed.

The hydrogen adsorbent may be one selected from the group consisting of a palladium oxide (II), a zinc oxide, palladium, titanium, nickel, and magnesium, or a mixture thereof, for example. Thus, the adsorption performance of the hydrogen gas that exists in the vacuum insulator or is introduced into the vacuum insulator from the outside can be improved.

In an exemplary embodiment, the adsorbent may include a moisture adsorbent and a metal oxide having loss of oxygen. Thus, oxygen gas that exists in the vacuum insulator or is introduced into the vacuum insulator from the outside can be adsorbed.

In an exemplary embodiment, the metal oxide having loss of oxygen may be a titanium oxide or cerium oxide, and in detail, for example, a titanium oxide $TiO_{2-x}$ (where x is 0.1 to 0.5) having loss of oxygen or a cerium oxide $CeO_{2-x}$ (where x is 0.1 to 0.7) having loss of oxygen. Thus, the adsorption performance of the oxygen gas that exists in the vacuum insulator or is introduced into the vacuum insulator from the outside is improved.

In an exemplary embodiment, the moisture adsorbent may be one selected from the group consisting of an alkaline-earth oxide and zeolite, or a mixture thereof. Thus, water or vapor that exists in the vacuum insulator or is introduced into the vacuum insulator from the outside can be adsorbed.

The alkaline-earth oxide, in detail, for example, may be one selected from the group consisting of a calcium oxide, a magnesium oxide, a strontium oxide, and a barium oxide, or a mixture thereof. More preferably, the alkaline-earth oxide may be a calcium oxide having an average primary particle size of 1 μm or less and a specific surface area of 10 m²/g or less. Thus, the gas adsorption performance of the hydrogen adsorbent that can be used together or the metal oxide having loss of oxygen is improved so that both the short-term performance and the long-term performance of the vacuum insulator can be improved.

In an exemplary embodiment, the adsorbent may include a mixture of a transition metal oxide and palladium, and the amount of palladium with respect to the transition metal oxide may be 0.2 to 2 mass %, and the transition metal oxide may include a cerium oxide and a copper oxide, and the content of the copper oxide with respect to the total amount of the transition metal oxide may be in the range of 5 to 50 mass %. Thus, hydrogen gas and carbon monoxide gas that exist in the vacuum insulator or are introduced into the vacuum insulator from the outside can be adsorbed.

In an exemplary embodiment, the specific surface area of the transition metal oxide may be 5 to 50 m²/g. Thus, the adsorption capacity of hydrogen gas and carbon monoxide gas that exist in the vacuum insulator or are introduced into the vacuum insulator from the outside is increased.

In an exemplary embodiment, the adsorbent may further include at least one metal hydroxide selected from the group consisting of a lithium hydroxide or a calcium hydroxide. Thus, the adsorption capacity of hydrogen gas and carbon monoxide gas that exist in the vacuum insulator or are introduced into the vacuum insulator from the outside is increased.

In an exemplary embodiment, the content of the at least one metal hydroxide with respect to the mixture of the transition metal oxide and palladium may be 50 to 95 mass %. Thus, the adsorption capacity of hydrogen gas and carbon monoxide gas that exist in the vacuum insulator or are introduced into the vacuum insulator from the outside is increased.

In an exemplary embodiment, the adsorbent may further include a moisture adsorbent, and the content of the mixture of the transition metal oxide and palladium with respect to the moisture adsorbent may be 0.8 to 5 mass %. Thus, the adsorption capacity of water, vapor, hydrogen gas, and carbon monoxide gas that exist in the vacuum insulator or are introduced into the vacuum insulator from the outside is increased.

According to another aspect of the present disclosure, there is provided a method of manufacturing a vacuum insulator including an outer envelope, a container accommodated in the outer envelope, and an adsorbent that is accommodated in the outer envelope and adsorbs gas, the method including: disposing the adsorbent in a first space inside the container; forming an opening in the container; disposing the container having the opening formed therein, in the outer envelope; and performing vacuum discharge in the outer envelope in which the container is disposed, and in the performing of vacuum discharge, the adsorbent may be exposed to and dispersed into a second space between the outer envelope and the container from the container through at least some of the opening due to a suction force of vacuum discharge.

According to the present disclosure, due to the adsorbent exposed to and dispersed into the second space from the opening of the container, gas that exists in the vacuum insulator may be quickly adsorbed so that the initial performance • the short-term performance of the vacuum insulator can be improved. Also, the adsorbent that remains in the first space formed with an inside surface of the container may adsorb gas that is introduced into the vacuum insulator from the outside for a long term so that the long-term performance of the vacuum insulator can be improved.

In an exemplary embodiment, the first space and the second space may communicate with each other through the opening, and openings may be respectively formed in two facing facets of the container, and two openings may be formed so that an axis parallel to a direction of suction of vacuum discharge passes through the two openings. Thus, due to a suction action of vacuum discharge, a flow of gas occurs in the vacuum insulator toward the opening closer to the discharge port from the opening distant from the discharge port, and the adsorbent accommodated in the first space is effectively dispersed into the second space through the opening closer to the discharge port. Also, gas that remains in the vacuum insulator can be effectively adsorbed.

In an exemplary embodiment, a core material may be charged in the second space, and the method may include, before the disposing of the container having the opening formed therein, in the outer envelope, forming a concave portion of the core material around an expected position in which the opening is to be disposed. Thus, the adsorbent placed in the first space is easily dispersed into the second space through the opening.

In an exemplary embodiment, the adsorbent may be provided in a powder shape, and the average particle size of the adsorbent may be 0.1 to 500 μm. Thus, because exposure • dispersion of the adsorbent from the opening is promoted, the vacuum insulating having both excellent short-term performance and long-term performance can be provided.

The above-described insulator and vacuum insulator may be used in a refrigerator, a freezer, a hot-water supply container, an insulator for a vehicle, an insulator for a building, a vending machine, a cold reserving box, a heat reserving box, or a freezer car, and in particular, suitably, may be disposed in the refrigerator.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Hereinafter, the present disclosure will be described in detail with reference to the accompanying drawings, in which exemplary embodiments of the disclosure are shown. The following description of exemplary embodiments is essentially just an example and is not intended to limit the disclosure, applications or the use thereof.

First Embodiment

<Refrigerator>

Figure 1:
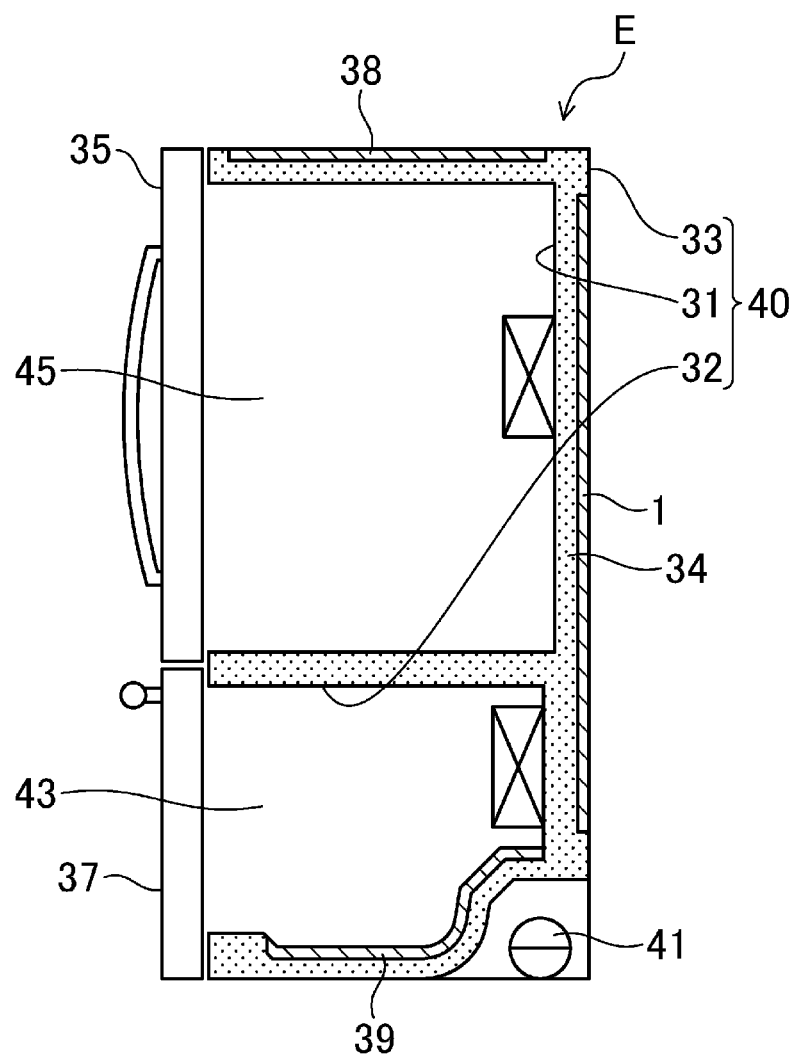
FIG. 1 illustrates a cross-sectional view of a configuration of a refrigerator according to various embodiments of the present disclosure.

FIG. 1 illustrates a cross-sectional view of a configuration of a refrigerator E according to various embodiments of the present disclosure.

A refrigerator E according to the current embodiment includes an outer case 33, and inner cases 32 and 31 that are accommodated in the outer case 33 and respectively form storage compartments therein, as illustrated in FIG. 1. Both the inner cases 32 and 31 and the outer case 33 have openings formed in a forward direction. In an example of FIG. 1, a storage compartment in the inner case 32 is a freezer compartment 43 set at a freezing temperature, and a storage compartment in the inner case 31 is a refrigerator compartment 45 set at a refrigerating temperature.

A vacuum insulator 1 on a rear surface of the refrigerator E is disposed between the inner cases 32 and 31 and the outer case 33, a vacuum insulator 38 on a ceiling surface of the refrigerator E is disposed between the inner case 31 and the outer case 33, and a vacuum insulator 39 on the floor of the refrigerator E is disposed between the inner case 32 and the outer case 33. In addition, a vacuum insulator (not shown) on both sides of the refrigerator E is disposed between the inner cases 32 and 31 and the outer case 33. In addition, the vacuum insulators 38 and 39 may be vacuum insulators according to the current embodiment or well-known insulators or vacuum insulators that are generally used in a refrigerator. In addition, the vacuum insulator 1 may be applied to a door, a partition, etc. of the refrigerator E. Thus, an insulation performance can be further improved so that a refrigerator having an excellent insulation performance, an excellent energy saving performance and an excellent internal volume efficiency can be attained.

The inner cases 32 and 31, the outer case 33, the vacuum insulators 1, 38, and 39, a drawer type door 37 that closes an opening of the inner case 32, and a rotational door 35 that closes an opening of the inner case 31, for example, constitute an insulated case body 40. The outer case 33 is exposed to the outside except for a part thereof, and a front end of the outer case 33 is connected to the inner cases 32 and 31.

In addition, the refrigerator E according to the current embodiment includes a foam (hard) urethane 34, a refrigerating cycle including a compressor 41, electric boards, and electric wires in addition to the insulated case body 40 (includes not-shown elements). A part of a refrigerant pipe in the refrigerating cycle, a part of the electric wires, and the vacuum insulator 1 are respectively installed in proper places of a space that is a wall between the outer case 33 and the inner cases 32 and 31, and an insulator, such as the foam urethane 34 or a foam polystyrene, is filled in the remaining places of the space. A thickness of each material or base material is not specifically limited, and for example, the outer case 33 may be formed of iron or stainless steel, the inner cases 32 and 31 may be formed of acrylonitrile butadiene styrene copolymer (ABS), the refrigerant pipe may be formed of copper, aluminum, or iron, and a refrigerant may be R134a or R600a.

As a method of installing the vacuum insulator 1 in the refrigerator E, the insulator 1 is attached to an inside surface of the outer case 33 or outside surfaces of the inner cases 32 and 31, or is installed between the outer case 33 and the inner cases 32 and 31 without being attached to the outer case 33 and the inner cases 32 and 31, or a combination of these methods is used. An attachment means may be an adhesive, such as a double-sided tape or a hot melt, or a sticking agent. Also, a method of coating the hot melt includes beading, roll coating, bar coating, and spiraling. However, a means that has a sufficient adhesive force and is suitable for a work and a process may be properly selected.

<Vacuum Insulator>

Figure 2:
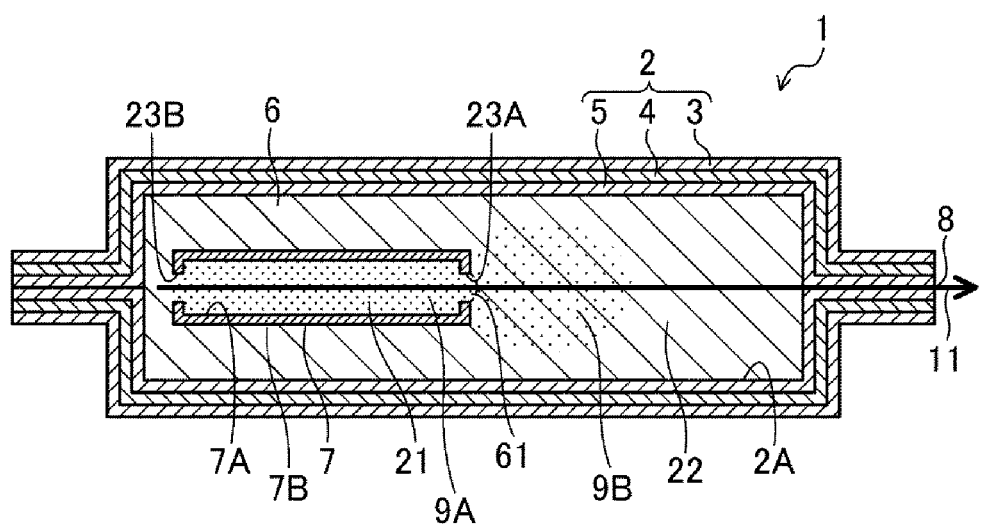
FIG. 2 illustrates a cross-sectional view of a configuration of a vacuum insulator according to various embodiments of the present disclosure.

FIG. 2 illustrates a cross-sectional view of a configuration of a vacuum insulator according to various embodiments of the present disclosure.

The vacuum insulator 1 according to the current embodiment includes a core material 6 that is accommodated in an outer envelope 2 and has a fine pore, such as glass wool or a silica powder, a container 7, and an adsorbent 9 that adsorbs gas, as illustrated in FIG. 2. The core material 6, the container 7, and the adsorbent 9 are embedded and sealed between two pieces of exterior materials that constitute the outer envelope 2. The vacuum insulator 1 may be used in a freezer, a hot-water supply container, an insulator for a vehicle, an insulator for a building, a vending machine, a cold reserving box, a heat reserving box, or a freezer car in addition to the refrigerator E.

Any conventional material that isolates the core material 6 from air or moisture and has a gas barrier property may be used as the exterior materials that constitute the outer envelope 2. For example, a plastic film formed of a thermoplastic resin or a laminating film formed by laminating a metal foil and thus having a barrier property can be used. In detail, as illustrated in FIG. 2, the exterior materials each have a thermally-deposited film 5, a gas barrier film 4 that is an intermediate layer, and a surface protection film 3 that is an outermost layer. The thermally-deposited film 5 may be polyolefin, such as low-density polyethylene, linear low-density polyethylene, or high-density polyethylene, a thermoplastic resin, such as an ethylene-acetate acid vinyl copolymer, or a mixture thereof, for example. The gas barrier film 4 may be a metal foil, such as aluminum or stainless, or a film formed by depositing a metal atom, such as aluminum, or a metal oxide, such as alumina or silica, on a polyethylene terephthalate film or an ethylene-vinyl alcohol copolymer. The surface protection film 3 may be, for example, polyamide(nylon) (PA), polyester, polyolefin, polyimide, polymethylmethacrylate (PMMA), or the like. In addition, the outer envelope 2 does not need to be the above-described laminating film but may be a metal container or a glass container, or a gas barrier container on which a resin and a metal are stacked. For example, the outer envelope 2 may be polychloride vinylidene, polyvinyl alcohol, ethylene-vinyl alcohol copolymer, polyester, polypropylene, polyamide, polyethylene, a film having a metal deposited on these films, or a container having a metal foil molded thereon. In addition, the outer envelope 2 may be a molded material made by laminating one or two or more kinds of these films.

The core material 6 is disposed inside the outer envelope 2, as illustrated in FIG. 2, and serves as a frame of the vacuum insulator 1. A material for the core material 6 is not specifically limited, and a well-known material may be used to form the core material 6. In detail, an inorganic fiber, such as glass wool, rock-wool, alumina fiber, or a metal fiber formed of a metal having low thermal conductivity, or an organic fiber, such as a synthetic fiber, for example, polyester, polyamide, acryl, polyolefin, or aramide, cellulose manufactured of wood pulp, a natural fiber, such as cotton, hemp, wool, or silk, a regenerated fiber, such as rayon, or a semi-synthetic fiber, such as acetate, may be used as the material for the core material 6. These materials for the core material 6 may be solely used or a mixture of two or more kinds of materials. Among them, glass wool is preferable in terms of an insulation performance or costs. The core material 6 formed of these materials has high elasticity of a fiber, low thermal conductivity of the fiber and low industrial costs.

The inside of the outer envelope 2 is vacuum sucked from a discharge port 8 formed at an end of the outer envelope 2 and is decompressed in terms of improvements in the insulation performance.

The container 7 serves to maintain an adsorbent 9A that will be described later, as illustrated in FIG. 2. A porous container, such as a non-woven fabric or gas-permeable film or a non-porous container, such as a gas barrier film, may be used as the container 7. A material for the container 7 may be a thermoplastic resin, such as polyethylene, polypropylene, polyester, poly(lactic acid), a mixture thereof, or a stack thereof. The shape of the container 7 is not specifically limited, and the shape of a general container, such as a cuboid shape, a cubic shape, a spherical shape, or a sack shape, may be used.

In addition, the container 7 may be formed of a non-woven fabric made of a resin material having oxygen gas permeability of 16 g/m2·24 h·atm or less. By using the non-woven fabric having this property, the amount of injection of gas, such as oxygen, into the container 7 is controlled to be appropriate so that deterioration of the adsorbent 9A that exists in a first space 21 does not easily occur and a long-term adsorption performance of the adsorbent 9A can be improved. The non-woven fabric having this property may be formed of one selected from the group consisting of polyethylene, polypropylene, and polyethyleneterephthalate, or a mixture thereof.

The inside of the vacuum insulator 1 includes the first space 21 formed with an inside surface 7A of the container 7 and a second space 22 formed with an outside surface 7B of the container 7 and an inside surface 2A of the outer envelope 2. Openings 23A and 23B are formed in the container 7, and the first space 21 and the second space 22 communicate with each other through the openings 23A and 23B. Also, in FIG. 2, a space in inside circumferential surfaces of the openings 23A and 23B is a part of the first space 21.

The opening 23A is formed in a closest surface to the discharge port 8 of the outer envelope 2 of surfaces of the container 7. The opening 23B is formed in a surface facing the surface in which the opening 23A is formed, i.e., in a farthest surface from the discharge port 8 of the outer envelope 2. The openings 23A and 23B have circular shapes and same diameters.

As illustrated in FIG. 2, an axis 11 that passes through the openings 23A and 23B exists. In other words, when the container 7 is viewed from a surface of the opening 23A, the openings 23A and 23B overlap each other, and when there is no adsorbent 9, outside of the container 7 can be seen through the openings 23A and 23B. In addition, the axis 11 is parallel to a direction of suction of the discharge port 8 of the outer envelope 2 (is identical to the direction of suction of the discharge port 8 of the outer envelope 2 in FIG. 2).

Here, the adsorbent 9A that is a part of the adsorbent 9, exists in the first space 21 inside the container 7, and an adsorbent 9B that is the remaining part of the adsorbent 9, exists in the second space 22 formed with the container 7 and the outer envelope 2. The adsorbent 9B is dispersed into the second space 22 from the first space 21 through the opening 23A of the container 7.

According to this configuration, because the adsorbent 9B is dispersed into the second space 22, gas included in the vacuum insulator 1 may be adsorbed in early stages. In addition, because the adsorbent 9A exists in the first space 21 inside the container 7, even when the adsorption performance of the adsorbent 9B in the second space 22 is lowered, due to the adsorbent 9A that exists in the first space 21, gas introduced into the vacuum insulator 1 from the outside through the openings 23A and 23B is adsorbed so that the adsorption performance of the adsorbent 9 can be maintained for a long term.

In addition, as illustrated in FIG. 2, a concave portion 61 is formed in the second space 22 around the opening 23A closer to the discharge port 8 by removing or pressing the core material 6 around the opening 23A. The adsorbent 9B is dispersed into the second space 22 to be diffused from the concave portion 61. Thus, because the adsorbent 9B disposed in the concave portion 61 around the opening 23A is easily in contact with gas, the adsorption performance of the adsorbent 9 is improved.

The adsorbent 9 may include a gas adsorbent that adsorbs target gas, in particular, a hydrogen adsorbent that adsorbs hydrogen, and a moisture adsorbent that adsorbs moisture. Hereinafter, this will be described in detail.

First, the adsorbent 9 may include the hydrogen adsorbent. This is based on the following reasons. That is, on the present inventor's investigation, a main gas that remains in a vacuum insulator that accommodates only the moisture adsorbent is nitrogen, hydrogen, oxygen, a carbon monoxide, and a carbon dioxide. Among them, hydrogen has higher thermal conductivity that those of nitrogen, oxygen, and water and exists in the vacuum insulator and thus greatly affects deterioration of thermal conductivity. In addition, when a titanium oxide or a cerium oxide having loss of oxygen is manufactured by hydrogen reduction, hydrogen is discharged from the titanium oxide or the cerium oxide in a decompressed state. This is because an oxygen loss structure is formed by hydrogen reduction and thus hydrogen captured in a loss portion of the titanium oxide or the cerium oxide is discharged from the titanium oxide or the cerium oxide during oxygen adsorption in the decompressed state. Thus, it is apparent that, when the above-described titanium oxide or cerium oxide is applied to the vacuum insulator, hydrogen is discharged and thermal conductivity of the vacuum insulator is rather deteriorated. Thus, a gas adsorbent of the present disclosure may include hydrogen adsorption components. Because the hydrogen adsorbent and the titanium oxide or cerium oxide having loss of oxygen are disposed in the same space and hydrogen discharged when the titanium oxide or the cerium oxide adsorbs oxygen is adsorbed by a dehydration material, a very small amount of hydrogen is changed into water, and changed water is adsorbed by the moisture adsorbent that coexists in the gas adsorbent, and deterioration of thermal conductivity of a decompressed environment can be suppressed.

In detail, the hydrogen adsorbent may be one selected from the group consisting of a palladium oxide (II), a zinc oxide, palladium, titanium, nickel, and magnesium, or a mixture thereof, for example. Among them, the palladium oxide (II) is particularly preferable. The palladium oxide (II) changes hydrogen into water. For this reason, the gas adsorbent is formed by adding the moisture adsorbent and the palladium oxide (II) so that an adsorbent capable of removing both moisture and hydrogen, can be obtained, exists in the vacuum insulator or the adsorption performance of a hydrogen gas introduced into the vacuum insulator from the outside can be improved.

Thus, because the adsorbent 9 exists in the vacuum insulator 1 or absorbs the hydrogen gas introduced into the vacuum insulator 1 from the outside, preferably, the adsorbent 9 includes the palladium oxide (II). The palladium oxide (II) (PdO) with respect to the total amount of the adsorbent 9 contains, preferably, 0.001 to 2.5 mass %, more preferably, 0.0015 to 1 mass %, and in particular, preferably, 0.002 to 0.25 mass %.

In addition, preferably, the adsorbent 9 includes a metal oxide having loss of oxygen, and in detail, for example, a titanium oxide ($TiO_{2-x}$) (where x is 0.1 to 0.5) having loss of oxygen and a cerium oxide ($CeO_{2-x}$) (where x is 0.1 to 0.7) having loss of oxygen. Thus, the adsorption performance of an oxygen gas that exists in the vacuum insulator 1 or is introduced into the vacuum insulator 1 from the outside, is improved. The metal oxide having loss of oxygen with respect to the total amount of the adsorbent 9 contains, preferably, 0.01 to 25 mass %, more preferably, 0.05 to 2.5 mass %, and in particular, preferably, 0.1 to 0.25 mass %.

An oxygen adsorption speed of the titanium oxide or cerium oxide having loss of oxygen is very large, and when the titanium oxide or cerium oxide in a powder state is exposed to the atmosphere, the titanium oxide or cerium oxide generates heat due to an adsorption heat and is inflammable due to a reaction with oxygen in the atmosphere. A method of preventing this problem by forming a mixture of a resin and the titanium oxide or cerium oxide or by capping a carbon dioxide has also been known. However, in forming of the mixture of the resin and the titanium oxide or cerium oxide in the decompressed state, outgassing is generated from the resin, and like in capping the carbon dioxide, there is a high probability that the carbon dioxide is outgassed.

Thus, there is a problem in handing the titanium oxide or cerium oxide in the atmosphere before inserting the titanium oxide or cerium oxide into the vacuum insulator. Thus, a reaction of oxygen with the titanium oxide or cerium oxide having loss of oxygen can be rate controlled using a dry-coated tablet shape in which the titanium oxide or cerium oxide is mixed with the moisture adsorbent and a nucleus of the titanium oxide or cerium oxide is covered with the moisture adsorbent.

Also, the adsorbent 9 may include a material having a nitrogen adsorption capability, because the adsorbent 9 exists in the vacuum insulator 1 or adsorbs nitrogen gas introduced into the vacuum insulator 1 from the outside. In detail, the material is at least one from lithium (Li), vanadium (V), and zirconium (Zr), for example, metal Li, and/or an Li alloy. The material is preferably, an alloy of Li and alkaline-earth metal among Li alloys, and in particular, a lithium-barium (Li—Ba) alloy is preferable in terms of a high nitrogen adsorption performance. The metal with respect to the total amount of the adsorbent 9 contains, preferably, 0.01 to 2.5 mass %, more preferably, 0.1 to 2.0 mass %, and in particular, preferably, 1.3 to 1.6 mass %. In addition, since these metals can be inactivated by moisture, they may be used together with the above-described adsorbent material, such as a calcium oxide.

In addition, because the adsorbent 9 exists in the vacuum insulator 1 or adsorbs moisture introduced into the vacuum insulator 1 from the outside, preferably, the adsorbent 9 includes an adsorbent material having a moisture adsorption capability, i.e., a moisture adsorbent.

The moisture adsorbent is not specifically limited and may be an alkaline-earth oxide that is a chemical moisture adsorbent. The alkaline-earth oxide is one selected from the group consisting of a calcium oxide, a magnesium oxide, a strontium oxide, and a barium oxide, or a mixture thereof. In particular, the calcium oxide may adsorb moisture in an environment where a vapor pressure is very low and is preferable in terms of costs. It is expected that the calcium oxide having a large specific surface area is liable to adsorb moisture. However, on the present inventor's investigation, it is apparent that, when removal of hydrogen is performed by combining the calcium oxide with the palladium oxide (II), the calcium oxide having a small specific surface area is preferable. In detail, by using the calcium oxide having a specific surface area less than 10 $m^2/g$, the concentration of hydrogen inside the vacuum insulator can be greatly reduced compared to the case where a calcium oxide having a large specific surface area is used. The specific surface area of the calcium oxide may be measured by a BET technique. In order to obtain the calcium oxide having such as specific surface area, an average primary particle size of the calcium oxide may be 1 μm or less.

In addition, a physical moisture adsorbent may also be used. As the physical moisture adsorbent, for example, at least one selected from the group consisting of zeolite, alumina, and silica gel may be used, and among them, zeolite is preferable. Zeolite is not specifically limited and includes a porous crystalline alumino silicate, and the ratio of alumina with respect to silica in the frame of zeolite is 1 to 1500, preferably, 5 to 1000, more preferably, 5.5 to 500.

The moisture adsorbent in the adsorbent 9 contains, preferably, 75 to 99.999 mass %, more preferably, 95 to 99.99 mass %, and in particular, preferably, 99.5 to 99.9 mass %.

In addition, the adsorbent 9 may include a mixture of a transition metal oxide and palladium. In this case, the amount of palladium with respect to the transition metal oxide is preferably 0.2 to 2 mass %, more preferably, 0.3 to 1.9 mass %, and in particular, preferably, 0.4 to 1.8 mass %. In addition, the transition metal oxide may include a cerium oxide and a copper oxide. In this case, the content of the copper oxide with respect to the total amount of the transition metal oxide is, preferably, in the range of 5 to 50 mass %, more preferably, in the range of 7 to 30 mass %, and in particular, preferably, in the range of 10 to 20 mass %. Thus, hydrogen gas and carbon monoxide gas that exist in the vacuum insulator 1 or are introduced into the vacuum insulator 1 from the outside may be adsorbed.

In addition, the specific surface area of the transition metal oxide is preferably 5 to 50 $m^2/g$, more preferably, 7 to 48 $m^2/g$, and in particular, preferably, 10 to 45 $m^2/g$. Thus, the adsorption capacity of a hydrogen gas and a carbon monoxide gas that exist in the vacuum insulator 1 or are introduced into the vacuum insulator 1 from the outside is increased.

The adsorbent 9 may further include at least one metal hydroxide selected from the group consisting of a lithium hydroxide or a calcium hydroxide. In this case, the content of the metal hydroxide with respect to the mixture of the transition metal oxide and metal palladium is preferably 50 to 95 mass %, more preferably, 55 to 90 mass %, and in particular, preferably, 60 to 85 mass %. Thus, the adsorption capacity of hydrogen gas and carbon monoxide gas that exist in the vacuum insulator 1 or are introduced into the vacuum insulator 1 from the outside is increased.

In addition, the adsorbent 9 may include the above-described moisture adsorbent in addition to the mixture of the transition metal oxide and palladium. The content of the mixture of the transition metal oxide and palladium with respect to the moisture adsorbent is preferably 0.8 to 5 mass %, more preferably, 1.0 to 4.5 mass %, and in particular, preferably, 1.2 to 4.0 mass %. Thus, the adsorption capacity of water, vapor, a hydrogen gas and a carbon monoxide gas that exist in the vacuum insulator 1 or are introduced into the vacuum insulator 1 from the outside is increased.

<Method of Manufacturing Vacuum Insulator>

Figure 3:
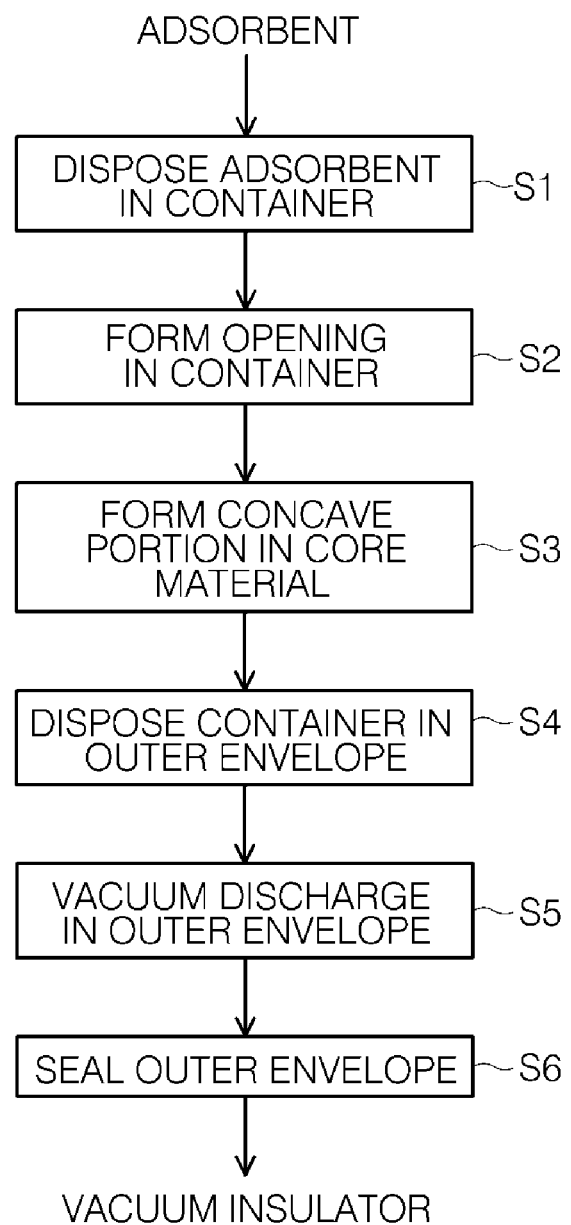
FIG. 3 illustrates a flowchart of a method of manufacturing a vacuum insulator according to various embodiments of the present disclosure.

FIG. 3 illustrates a flowchart of a method of manufacturing a vacuum insulator according to various embodiments of the present disclosure As illustrated in FIG. 3, the adsorbent 9 is prepared and is disposed in the container 7 before the openings 23A and 23B are formed in the container 7 (S1). The adsorbent 9 may use the above-described materials using a general known means, such as an automatic mortar, a mixture mill or a ball mill, for example. Also, this process may be performed under an inert gas atmosphere, such as under an Argon (Ar) gas atmosphere. In addition, when the content of each of materials with respect to the total amount of the adsorbent 9 is small, after these materials are mixed on a scale increased by several tens of times, a required amount of the adsorbent 9 may be weighed from the mixture and may be used.

In Process S1, the openings 23A and 23B are formed in the container 7 in which the adsorbent 9 is disposed, using a punching jig, for example (S2).

Next, the core material 6 is disposed inside the outer envelope 2, and a predetermined amount of a portion of the core material 6 corresponding to the periphery of the opening 23A in an expected position in which the container 7 is to be installed, is removed, or the core material 6 is pushed to another region so that the concave portion 61 is formed (S3).

Figure 4:
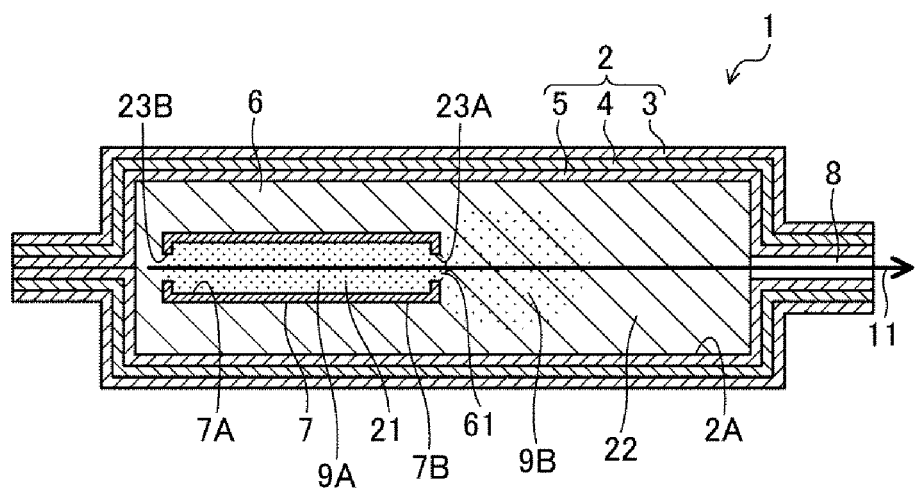
FIG. 4 illustrates a cross-sectional view of a vacuum discharge process in an outer envelope in the method of manufacturing the vacuum insulator according to various embodiments of the present disclosure.

As illustrated in FIG. 4, the container 7 having the openings 23A and 23B formed therein is disposed in a predetermined position inside the outer envelope 2 (S4). Also, the container 7 is disposed in such a way that the opening 23A is closer to the discharge port 8 and the axis 11 that passes through the openings 23A and 23B is approximately parallel (identical) to a direction of suction of vacuum discharge.

Last, gas in the outer envelope 2 is discharged from the discharge port 8 opened through a vacuum pump, etc., for example, (S5), and the discharge port 8 is closed, and the outer envelope 2 is sealed (S6).

Here, in Process S5, as illustrated in FIG. 4, due to a suction force of vacuum discharge, the adsorbent 9 is exposed to and dispersed into the second space 22 through the opening 23A from the first space 21 inside the container 7.

As described above, because the direction of suction of vacuum discharge and the axis 11 that passes through the openings 23A and 23B are approximately parallel to each other, a flow of gas occurs in the vacuum insulator 1 toward the opening 23A closer to the discharge port 8 from the opening 23B distant from the discharge port 8, and the adsorbent 9 accommodated in the first space 21 is effectively dispersed into the second space 22 through the opening 23A closer to the discharge port 8.

In this way, due to the adsorbent 9B exposed to and dispersed into the second space 22 from the opening 23A of the container 7, gas that exists in the vacuum insulator 1 is rapidly adsorbed so that the initial performance • short-term performance of the vacuum insulator 1 can be improved. In addition, the adsorbent 9A that remains in the first space 21 inside the container 7 can adsorb gas introduced into the vacuum insulator 1 from the outside for a long term even when the adsorption performance of the adsorbent 9B in the second space 22 is lowered, so that a long-term performance of the vacuum insulator 1 can be improved.

In addition, the speed of vacuum discharge is not specifically limited, and an initial speed may be set to about 200 $m^3/h$, and a maximum speed may be set to about 400 $m^3/h$. In addition, a degree of vacuum in the vacuum insulator 1 is preferably 1 Pa or less, more particularly, 0.1 Pa or less, and in particular, preferably, 0.01 Pa or less in terms of improvements in an insulation performance.

In addition, the adsorbent 9 preferably has a powder shape in terms of improvements in a dispersion property into the second space 22 in Process S5, and an average particle size of the adsorbent 9 is preferably 0.1 to 500 μm, more particularly, 1 to 300 μm, and in particular, preferably, 10 to 100 μm. In addition, the particle size generally means a secondary particle size.

The ratio of the amount of the adsorbent 9B dispersed into the second space 22 with respect to the total amount of the adsorbent 9 (hereinafter, referred to as a "an index of dispersion".) is preferably 5 to 60 mass %, more particularly, 5 to 50 mass %, and in particular, preferably, 10 to 25 mass % in terms of improvements in both the short-term performance and the long-term performance of the vacuum insulator 1. When the amount of the adsorbent 9B is less than 5 mass %, the short-term performance of the adsorbent 9B is not sufficiently exhibited, and when the amount of the adsorbent 9B is equal to or greater than 60 mass %, the long-term performance of the adsorbent 9 is not improved.

Also, the shape of the opening 23 formed in Process S2 is not specifically limited and may be a circular or rectangular shape. In addition, in the container 7 illustrated in FIG. 4, the opening 23 may have an approximately semi-cylindrical shape from a top surface to a bottom surface via side surfaces of the container 7 or may have a configuration from which an approximately cuboid shape is cut out. In this case, the maximum diameter of the opening 23 in a development view of the container 7, i.e., the maximum width of the opening 23 that represents a diameter, for example, when the opening 23 has a circular shape, a diagonal length when the opening 23 has a rectangular shape, and a long diameter when the opening 23 has an oval • long circular shape, is preferably 3 to 35 mm, more particularly, 4 to 34 mm, and in particular, preferably, 5 to 33 mm.

In detail, for example, as in the following embodiments, the container 7 illustrated in FIG. 6 may be used. In this case, as illustrated in FIGS. 7 through 9, the openings 23A and 23B each having an approximately semi-cylindrical shape may be formed. The openings 23A and 23B each having the approximately semi-cylindrical shape have an opening diameter d and a maximum diameter D, as illustrated in FIGS. 7 through 9. In this case, in a development view of FIG. 9, a heat sealing portion 75 is not developed. In addition, an opening formed in the top surface of the container 7 has a semi-circle of the opening diameter d. In the opening 23A illustrated in FIGS. 8 and 9, the maximum diameter D may be calculated by the following equation 1.

$$D=(d/2)\times 2+2h+k \qquad (1),$$

where h is a height of a facet 71 and k is a thickness of the heat sealing portion.

In addition, when the openings 23A and 23B are formed, as illustrated in FIG. 7, the openings 23A and 23B may be cut out in the shape of L1 or the shape of L2. In addition, in FIGS. 7 through 9, the openings 23A and 23B have the same shape and the same size, but the maximum diameter (or area) of the opening 23A is configured to be different from the maximum diameter (or area) of the opening 23B so that the openings 23A and 23B may have different shapes and different sizes. When vacuum discharge of Process S5 is performed, dispersion of the adsorbent 9 from the opening 23 may be expedited.

The shape of the concave portion 61 formed in Process S3 is not specifically limited and may be an approximately hemispherical shape or cuboid shape around the opening 23. The size of the concave portion 61 is the same as or greater than the size of the opening 23 in terms of both the adsorption performance of the adsorbent 9 and the insulation performance of the vacuum insulator 1 and may be smaller than the surface area of a surface having the opening 23 formed therein, in the container 7. By forming the concave portion 61, the amount of the core material 6 disposed around the opening 23 of the container 7 is reduced, or the core material 6 is not present so that the adsorbent 9 disposed in the first space 21 is easily dispersed into the second space 22 through the opening 23.

Second Embodiment

Figure 5:
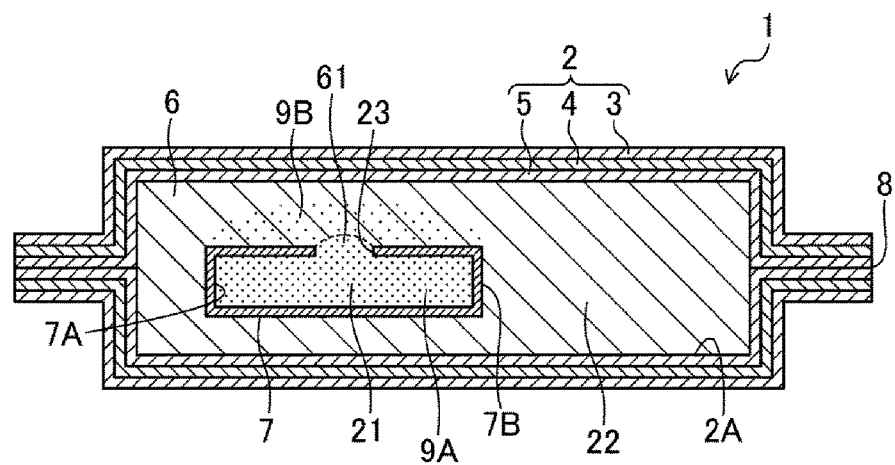
FIG. 5 illustrates a cross-sectional view of a configuration of a vacuum insulator according to various embodiments of the present disclosure.

FIG. 5 illustrates a cross-sectional view of a configuration of a vacuum insulator according to various embodiments of the present disclosure In the vacuum insulator 1 according to the above embodiment, the container 7 includes two openings 23A and 23B, but as illustrated in FIG. 5, only one opening 23 may be formed. In addition, a position where the opening 23 is to be formed, is not limited to the discharge port 8 of the outer envelope 2, and the opening 23 may be formed in any surface of the container 7. In detail, for example, as illustrated in FIG. 6, the opening 23 is formed in a facet 72 of the container 7, and as illustrated in FIG. 5, the opening 23 may be installed in such a way that an opening direction of the opening 23 is perpendicular to the direction of suction of vacuum discharge.

According to this configuration, because only one opening 23 is formed, workability in Processes S2 and S4 is improved. In addition, because, in Process S4, when the container 7 is installed in the outer envelope 2, the installation direction of the container 7 does not need to be identical to the direction of the discharge port 8, the container 7 may be easily installed regardless of its installation direction.

Third Embodiment

In the first and second embodiments, two openings 23 or one opening 23 is formed, but three or more openings, i.e., a plurality of openings may be formed. In detail, for example, a plurality of small openings each having about 3 mm of a maximum diameter may be formed. Thus, in Process S4, when the container 7 is installed in the outer envelope 2, the adsorbent 9 does not easily overflow from the inside of the container 7 so that workability is improved.

Regardless of the embodiment of the opening 23, the ratio of an area of the opening 23 with respect to the total surface area of an outside surface 7B of the container 7 (hereinafter, referred to as an "area ratio".) is preferably 2 to 40%, more particularly, 3 to 30%, and in particular, preferably, 4 to 20%. Thus, the ratios of the adsorbent 9A and the adsorbent 9B are adjusted so that both the short-term performance and the long-term performance of the adsorbent 9 can be improved.

In case of this configuration, the adsorbent 9B has only to be dispersed into the second space 22 from at least some of the plurality of openings.

Fourth Embodiment

In the first through third embodiments, although one container 7 that accommodates the adsorbent 9 is installed in the vacuum insulator 1, a plurality of containers 7 that accommodate the adsorbent 9 may be installed in the vacuum insulator 1. Thus, the number of openings can be increased so that the adsorbent 9B can be widely dispersed in the vacuum insulator 1 and a dispersion property of the adsorbent 9B is effectively improved. The containers 7 may be installed closer to or spaced apart from each other, and when the containers 7 are installed to be spaced apart from each other and the adsorbent 9B is dispersed into each of the containers 7, efficiency of adsorption is further improved. In addition, when a plurality of containers 7 are installed, in Process S3, a plurality of concave portions 61 may be formed according to the installation place of each of the containers 7.

Other Embodiments

In the first through fourth embodiments, in the vacuum insulator 1, the inside of the outer envelope 2 is decompressed, but the vacuum insulator 1 may be installed as a general insulator at a normal pressure inside or outside the outer envelope 2 in a state in which vacuum suction is not performed. In this case, the container 7 that accommodates the adsorbent 9A is disposed in the outer envelope 2, and the adsorbent 9B is dispersed into the core material 6, and Process S5 is omitted so that an insulator can be manufactured. In addition, as a method of manufacturing the insulator at the normal pressure, after vacuum discharge is performed and the adsorbent 9B is dispersed in Process S5, the inside of the outer envelope 2 is opened to the atmosphere using an inert gas, such as Ar, and is returned to the normal pressure and then the outer envelope 2 is sealed so that the insulator at the normal pressure can also be manufactured. Thus, even when gas having larger thermal conductivity than that of air or adsorbed water is introduced into a pore inside the insulator, lowering of the insulation performance (increase in thermal conductivity) can be suppressed, and both the short-term performance and the long-term performance of the insulator can be improved. The insulator at the normal pressure may be used to be suitable for, in particular, a car insulator that does not require a cold reserving performance, or a building insulator.

EXAMPLES

Next, specific examples will be described.

Samples of vacuum insulators according to Examples 1 to 7 and Comparative Examples 1 to 7 were manufactured, and thermal conductivity of each of the vacuum insulators after 7 days from the manufacture of the samples and after an acceleration test was performed, was measured and the performance of each of the vacuum insulators was evaluated. The result thereof is shown in Table 1.

TABLE 1

| | | Examples | | | | | | |
|---|---|---|---|---|---|---|---|---|
| | | 1 | 2 | 3 | 4 | 5 | 6 | 7 |
| Container | Total surface area (mm$^2$) | 4982 | 4982 | 4982 | 4982 | 4982 | 4982 | 4982 |
| | The number of adsorbent containers (unit) | 1 | 1 | 1 | 2 | 2 | 1 | 1 |
| Opening | Shape | semi-cylindrical | semi-cylindrical | semi-cylindrical | semi-cylindrical | semi-cylindrical | circular | square |
| | The number of openings per container (place) | 2 | 2 | 2 | 2 | 2 | 30 | 1 |
| | Maximum diameter D(mm) | 11 | 23 | 33 | 29.5 | 33 | 3 | 28.3 |
| | Formation position (FIG. 6) | 71, 74 | 71, 74 | 71, 74 | 71, 74 | 71, 74 | 72 | 72 |
| | Area (mm$^2$) | 146 | 748 | 1594 | 1262 | 1594 | 212 | 400 |
| | Area ratio (%)※1 | 3.0 | 15.0 | 32.0 | 25.3 | 32.0 | 4.3 | 8.0 |
| Adsorbent | Shape | powder | powder | powder | powder | powder | powder | powder |
| | Average particle size (μm) | 50 | 50 | 50 | 50 | 50 | 50 | 50 |
| | Index of dispersion (mass %) | 5 | 15 | 25 | 40 | 50 | 5 | 6.5 |
| | Amount of CaO (g)※3 | 4 | 4 | 4 | 2 | 2 | 4 | 4 |
| | Amount of TiO$_{2-x}$(mg)※3 | 8.6 | 8.6 | 8.6 | 4.3 | 4.3 | 8.6 | 8.6 |
| | Amount of PdO (mg)※3 | 0.1 | 0.1 | 0.1 | 0.05 | 0.05 | 0.1 | 0.1 |
| Thermal conductivity index※2 | After 7 days from manufacture | 94 | 90 | 96 | 94 | 98 | — | — |
| | After acceleration test is performed | 128 | 127 | 128 | — | 129 | — | — |
| Evaluation | Workability | ◯ | ◯ | ◯ | ◯ | ◯ | ◯ | ◯ |

| | | Comparative Examples | | | | | | |
|---|---|---|---|---|---|---|---|---|
| | | 1 | 2 | 3 | 4 | 5 | 6 | 7 |
| Container | Total surface area (mm$^2$) | 4982 | 4982 | 4982 | 4982 | 4982 | 4982 | 4982 |
| | The number of adsorbent containers (unit) | 1 | 1 | 2 | 2 | 1 | 1 | 1 |
| Opening | Shape | — | — | semi-cylindrical | semi-cylindrical | circular | semi-cylindrical | circular |
| | The number of openings per container (place) | — | — | 2 | 2 | 1 | 2 | 1 |
| | Maximum diameter D(mm) | — | — | 37 | 41 | 2 | 43 | 10 |
| | Formation position (FIG. 6) | — | — | 71, 74 | 71, 74 | 72 | 71, 74 | 72 |
| | Area (mm$^2$) | — | — | 2020 | 2496 | 3.1 | 2753 | 79 |
| | Area ratio (%)※1 | — | — | 40.5 | 50.1 | 0.1 | 55.3 | 1.6 |
| Adsorbent | Shape | powder | powder | powder | powder | powder | powder | beads |
| | Average particle size (μm) | 50 | 50 | 50 | 50 | 50 | 50 | 2,000 |
| | Index of dispersion (mass %) | 0 | 0 | 60 | 75 | 0.5 | 37 | 0 |
| | Amount of CaO (g)※3 | 4 | 4 | 2 | 2 | 4 | 4 | — |
| | Amount of TiO$_{2-x}$(mg)※3 | 8.6 | 0 | 4.3 | 4.3 | 8.6 | 8.6 | — |
| | Amount of PdO (mg)※3 | 0.1 | 0 | 0.05 | 0.05 | 0.1 | 0.1 | — |
| Thermal conductivity index※2 | After 7 days from manufacture | 100 | 108 | 91 | 99 | — | — | — |
| | After acceleration test is performed | 130 | 157 | 132 | 134 | — | — | — |
| Evaluation | Workability | ⊚ | ⊚ | Δ | Δ | ◯ | X | X |

※1 [area (mm$^2$) of opening]/[total surface area (mm$^2$) of outside surface (inner side than deposited portion) before opening is formed] × 100
※2 Thermal conductivity (W/m/K) after 7 days from the manufacture of Comparative Example 1 (dispersion amount 0%) is set to 100.
※3 Amount of inclusion per adsorbent container Fabrication of Vacuum Insulator Samples Example 1

Under an Ar gas atmosphere, as an adsorbent, 120 g (99.783 mass %) of a calcium oxide (CaO) (average particle size of 50 μm, BET specific surface area of 5 m$^2$/g, Yoshizawa Lime Industries, Ltd.), 258 mg (0.215 mass %) of a titanium oxide (TiO$_{2-x}$) having loss of oxygen (average particle size of 10 μm, Ako Chemical Industries, Ltd. Tilack NUT), and 3.0 mg (0.002 mass %) of a palladium oxide (PdO) (average particle size of 10 μm, Wako Pure Chemical Industries, Ltd.) were respectively weighed, were put in a mortar and were mixed using a rolling pin.

Figure 6:
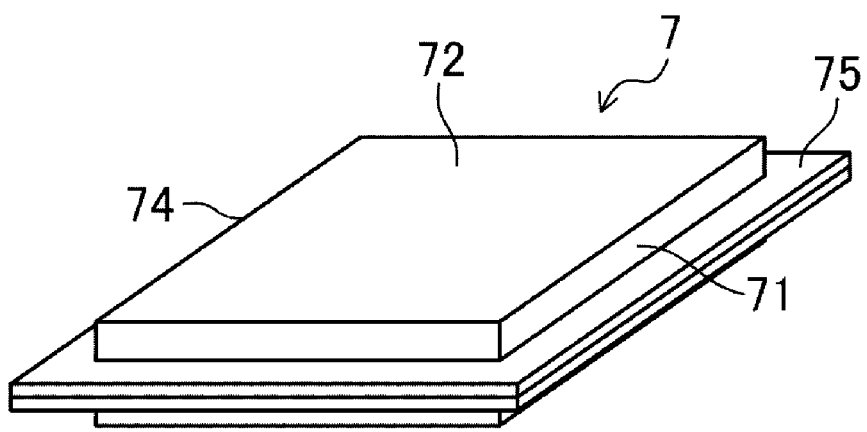
FIG. 6 illustrates a perspective view of a configuration of a container used in Examples and Comparative Examples according to various embodiments of the present disclosure.
Figure 7:
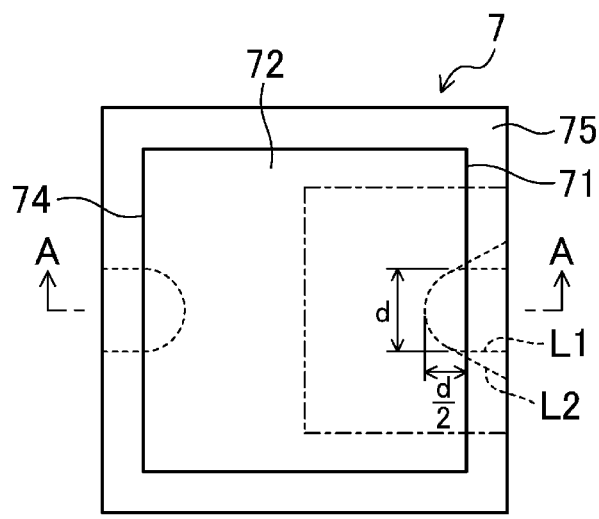
FIG. 7 illustrates a planar view of a process of forming openings in the container of FIG. 6 according to various embodiments of the present disclosure.
Figure 8:
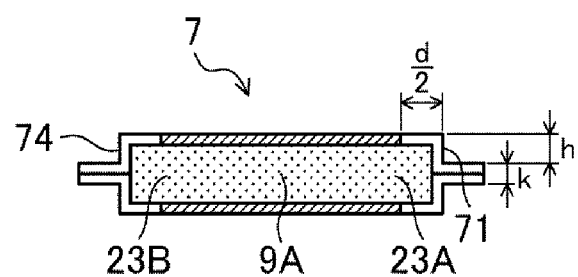
FIG. 8 illustrates a cross-sectional view of the container after the openings are formed in the container of FIG. 7, taken along line A-A according to various embodiments of the present disclosure.
Figure 9:
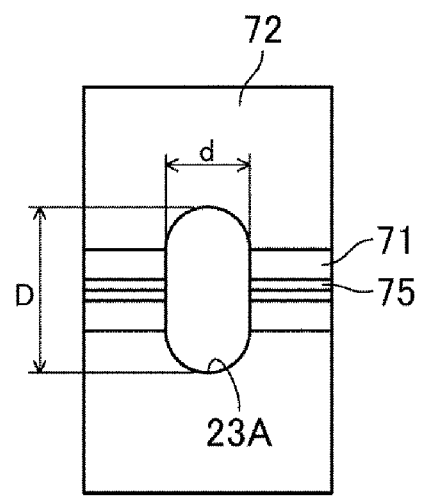
FIG. 9 illustrates a planar view of a portion including an opening of one side indicated by an alternate long and short dash line of FIG. 7 according to various embodiments of the present disclosure.

After 4.0087 g was weighed from the adsorbent and the weighed amount was put and sealed in a non-woven fabric container having an approximately cuboid sack shape illustrated in FIG. 6 (width of 67 mm, length of 67 mm, thickness of 3 mm, a heat sealing width of 10 mm, a total surface area 4982 mm$^2$ of an outside surface except for the heat sealing portion 75, mirror clone PM-30D, Yamanaka Industries, Ltd.), as illustrated in FIGS. 7 through 9, an opening having an approximately semi-cylindrical shape with an opening diameter d of 8 mm and a maximum diameter D of 11 mm was cut out from each of two facets 71 and 74 using a punching jig.

Separately, a glass wool stack was prepared as a core material, and glass wool around the opening in a certain position in which a container with the adsorbent is to be disposed, was cut such that a concave portion was formed. After the glass wool stack was dried in a dry furnace, the container with the adsorbent was disposed in the certain position in such a way that the opening having the maximum diameter of 11 mm was headed for the discharge port.

An outer envelope that includes a laminating film having a surface protection film 3 formed of polyamide (PA) of 15 μm, a gas barrier film 4 formed of aluminum-deposited polyethyleneterephthalate (vmPET) film of 12 μm and aluminum (AL) foil of 7 μm, and a thermally-deposited film 5 formed of linear low-density polyethylene (LLDPE) of 50 μm and a laminating film having a gas barrier film 4 formed of 3 pieces of vmPET films of 12 μm and a thermally-deposited film 5 formed of LLDPE of 50 μm and that forms the thermally-deposited films 5 by heat sealing (thermal depositing) to form a sack shape was dried in the dry furnace, and the glass wool stack in which the container with the adsorbent was disposed, was inserted into the outer envelope.

Last, gas in the outer envelope was discharged from the discharge port at an initial speed of about 200 m$^3$/h using a vacuum pump (LEYVAC LV80, WSU501 and WAU501, manufactured by Leybold Vacuum) in such a way that a degree of vacuum in a vacuum chamber was 0.01 Pa. Then, 15 minutes elapsed, and the discharge port was sealed by heat sealing so that a vacuum insulator was manufactured.

Example 2

A sample was manufactured by the same method as that of Example 1 except that the opening diameter d of the opening was set to 20 mm and the maximum diameter D thereof was 23 mm.

Example 3

A sample was manufactured by the same method as that of Example 1 except that the opening diameter d of the opening was set to 30 mm and the maximum diameter D thereof was 33 mm.

Example 4

A sample was manufactured by the same method as that of Example 1 except that 2.00435 g was weighed from the adsorbent and was put in the non-woven fabric container and the opening diameter d of the opening was set to 26.5 mm and the maximum diameter D thereof was 29.5 mm so that two adsorbent containers were installed.

Example 5

A sample was manufactured by the same method as that of Example 1 except that 2.00435 g was weighed from the adsorbent and was put in the non-woven fabric container and the opening diameter d of the opening was set to 30 mm and the maximum diameter D thereof was 33 mm so that two adsorbent containers were installed.

Example 6

A sample was manufactured by the same method as that of Example 1 except that openings each having a diameter of 3 mm were formed in 30 places of a facet indicated by the reference numeral 72 of FIG. 6.

Example 7

A sample was manufactured by the same method as that of Example 1 except that one square opening having a diagonal length of 28.3 mm (a length of one side of 20 mm) was formed in the facet indicated by the reference numeral 72 of FIG. 6.

Comparative Example 1

A sample was manufactured by the same method as that of Example 1 except that no opening was formed.

Comparative Example 2

A sample was manufactured by the same method as that of Example 1 except that no opening was formed and only 4 g of a calcium oxide (CaO) was used as an adsorbent.

Comparative Example 3

A sample was manufactured by the same method as that of Example 1 except that 2.00435 g was weighed from the adsorbent and was put in the non-woven fabric container and the opening diameter d of the opening was set to 34 mm and the maximum diameter D thereof was 37 mm so that two adsorbent containers were installed.

Comparative Example 4

A sample was manufactured by the same method as that of Example 1 except that 2.00435 g was weighed from the adsorbent and was put in the non-woven fabric container and the opening diameter d of the opening was set to 38 mm and the maximum diameter D thereof was 41 mm so that two adsorbent containers were installed.

Comparative Example 5

A sample was manufactured by the same method as that of Example 1 except that one circular opening having a diameter of 2 mm was formed in the facet indicated by the reference numeral 72 of FIG. 6.

Comparative Example 6

A sample was manufactured by the same method as that of Example 1 except that a semi-cylindrical opening having the opening diameter d of 40 mm and the maximum diameter D of 43 mm was formed.

Comparative Example 7

A sample was manufactured by the same method as that of Example 1 except that one circular opening having a diameter of 10 mm was formed in the facet indicated by the reference numeral 72 of FIG. 6 and beads having an average particle size of 2000 μm (silica gel, Mitsubishi Chemical Analytech) were used as an adsorbent.

<Regarding Index of Dispersion of Adsorbent>

Regarding the manufactured sample of the vacuum insulator, by opening the outer envelope of the sample immediately after being manufactured and weighing a mass of a container including the adsorbent, an initial mass (total amount) of the adsorbent accommodated in the container, a mass of the adsorbent that exists in the container from a difference in mass before and after manufacture, and a mass of the adsorbent considered to be dispersed outside the container were calculated and thus, the ratio of the mass of the adsorbent dispersed outside the container with respect to the total amount of the adsorbent was calculated into a percentage.

<Regarding Acceleration Test>

A cycle test in the following conditions A and B was carried out on the manufactured sample of the vacuum insulator using a constant temperature and constant humidity bath (SSE-47TX-A, Kato Inc.).

Condition A: −30° C., 2.5 hours
Condition B: 80° C., 65% RH, 5.5 hours

One cycle in the order of condition A, temperature rising, condition B, and temperature drop was set, and 28 cycles were carried out.

<Measurement of Thermal Conductivity>

Regarding the manufactured sample of the vacuum insulator (a width of 290 mm, a length of 410 mm, and a thickness of 12 mm), thermal conductivity of the sample was measured using a thermal conductivity measurement device (NETZSCH, HFM436, based on JIS A 1412-2 (heat-blow meter method) in a state in which a laminating film including an aluminum foil of the outer envelope was set at a low temperature side, on the condition of a high-temperature side of 38□ and a low temperature side of 10□(average temperature of 24□, ΔT=28K). Measurement was carried out after 7 days elapsed from the manufacture of the sample of the vacuum insulator and after the acceleration test was performed, respectively.

Also, in Table 1, a measurement value of thermal conductivity measured after 7 days elapsed from the manufacture of the sample of the vacuum insulator of Comparative Example 1 was set to 100 so that a measurement value of each of samples was indicated by a thermal conductivity index that was a relative value thereto.

<Workability>

This represents workability in Processes S2 and S4 of FIG. 3. Easiness of forming an opening and workability when installing an outer envelope of a container after the opening was formed, were evaluated in four stages "◎(very good)", "○(good)", "Δ(normal)", and "x(bad)".

<Consideration>

As shown in Table 1, regarding samples of a vacuum insulator according to Comparative Examples 1 and 2 having a configuration in which no opening was formed, in samples according to Examples 1 through 5, a thermal conductivity index was reduced both after 7 days from the manufacture and after an acceleration test was performed. In this respect, an opening is formed in a container to disperse an adsorbent into a second space so that both a short-term performance and a long-term performance of the vacuum insulator can be improved.

Figure 10:
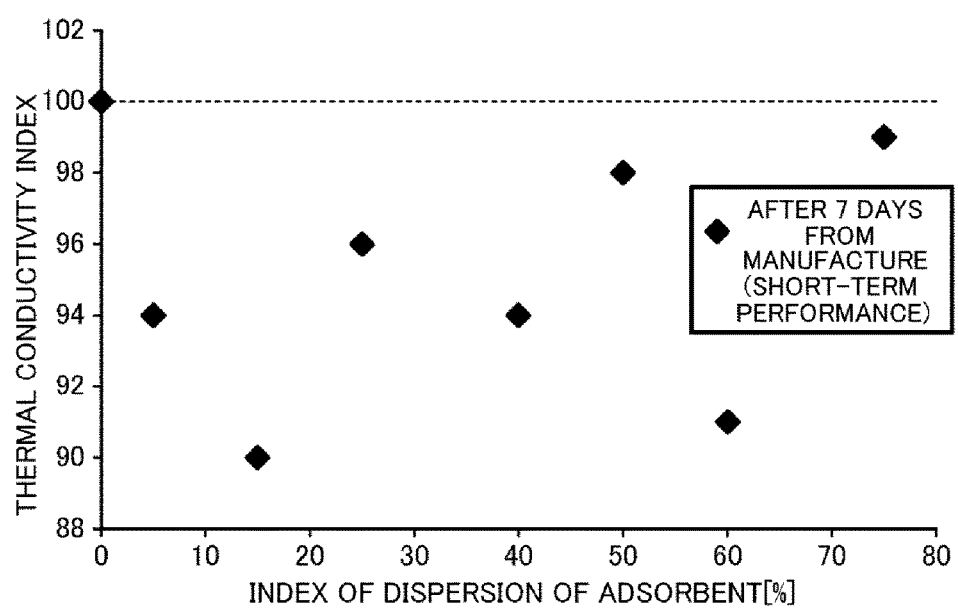
FIG. 10 illustrates a graph showing thermal conductivity indexes after 7 days from the manufacture of samples of vacuum insulators according to examples and comparative examples according to various embodiments of the present disclosure.
Figure 11:
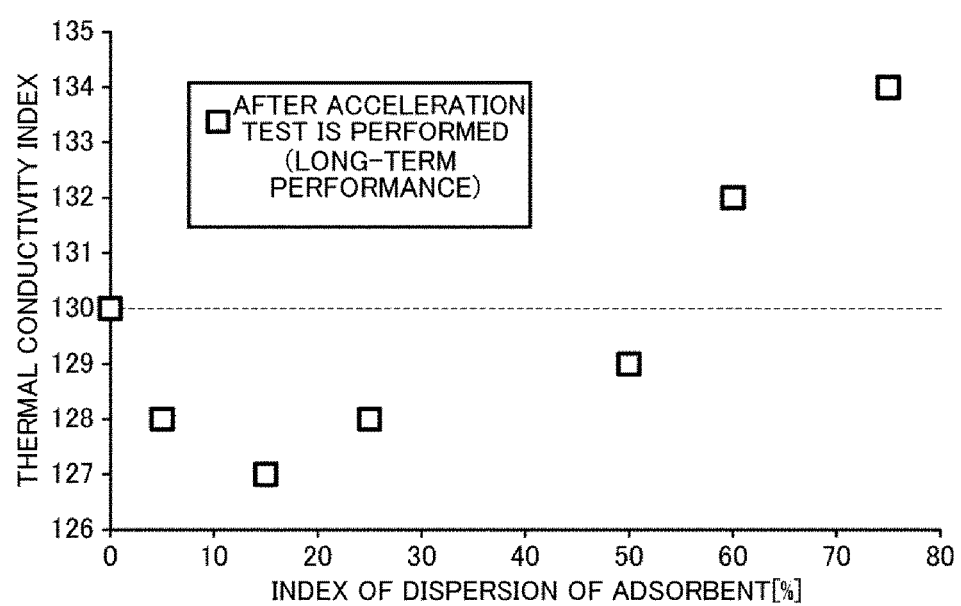
FIG. 11 illustrates a graph showing thermal conductivity indexes after an acceleration test is performed on the samples of the vacuum insulators according to Examples and Comparative Examples.

Regarding the samples according to Examples 1 through 5 and Comparative Examples 1, 3, and 4, a thermal conductivity index of an index of dispersion of the adsorbent is shown in FIGS. 10 and 11. In Examples 1 through 5 in which the index of dispersion is 5 to 50%, both a thermal conductivity index after 7 days from the manufacture and a thermal conductivity index after the acceleration test was performed, are lower than that of Comparative Example 1 so that the short-term performance and the long-term performance can be improved. In Comparative Example 3 in which the index of dispersion is 60%, a thermal conductivity index after 7 days from the manufacture is lower than that of Comparative Example 1, but a thermal conductivity index after the acceleration test was performed, is higher than that of Comparative Example 1 so that the short-term performance is improved, whereas the long-term performance is deteriorated compared to that of Comparative Example 1.

In Comparative Example 4 in which the index of dispersion is 75%, a thermal conductivity index after the acceleration test was performed, is higher than those of Comparative Examples 1 and 3 so that the long-term performance is not improved.

In Example 6, although openings were formed in 30 places of the facet 72 that does not contact the discharge port of the container, the dispersion amount of the adsorbent was large, and workability was good.

In Example 7, although one opening was formed in the facet 72 that does not contact the discharge port of the container and the shape of the opening was square, the dispersion amount of the adsorbent was large, and workability was good.

In Comparative Example 5, although one opening was formed in the same way as that of Example 7, the shape of the opening was circular and the maximum diameter D of the opening was 2 mm, workability was good, and the dispersion amount of the adsorbent was small.

In Comparative Example 6, although two openings were formed in the same way as that of Example 1 and the maximum diameter D of each of the openings was 43 mm, the dispersion amount of the adsorbent was large, and workability was bad.

In Comparative Example 7, although the shape of the adsorbent was beads having an average particle size of 2000 μm, both workability and the dispersion amount of the adsorbent were not good.

As described above, according to the present disclosure, because an adsorbent is dispersed in a second space outside a container, gas included in an insulator can be adsorbed in early stages. In addition, because the adsorbent also exists in a first space inside the container, even when the adsorption performance of the adsorbent in the second space is lowered, due to the adsorption performance of the adsorbent that exists in the first space, the adsorption performance of the adsorbent can be maintained for a long term. Thus, in terms of the insulation performance of the insulator, both a short-term performance and a long-term performance can be improved.

Because a short-term performance and a long-term performance of an insulator including an adsorbent that adsorbs gas can be simultaneously improved, the embodiments of the present disclosure are very useful.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator comprising:
    an inner case configured to form a storage compartment;
    an outer case coupled to an outside of the inner case;
    a refrigerating cycle configured to supply cold air into the storage compartment; and
    a vacuum insulator disposed between the inner case and the outer case, wherein the vacuum insulator comprises:
        an outer envelope;
        a container accommodated in the outer envelope; and
        an adsorbent configured to adsorb gas, wherein the adsorbent includes:
            a first part of the adsorbent existing in a first space formed with an inside surface of the container, and
            a second part of the adsorbent existing in a second space formed with an outside surface of the container and an inside surface of the outer envelope.

2. The refrigerator according to claim 1, wherein:
    the container comprises an opening through which the first space and the second space communicate with each other, and
    the second part of the adsorbent is dispersed into the second space around the opening.

3. The refrigerator according to claim 2, wherein:
    the opening comprises a plurality of openings respectively formed in two facing facets of the container, and
    an axis that passes through the plurality of openings exists.

4. The refrigerator according to claim 3, wherein:
    the outer envelope comprises a discharge port through which vacuum discharge is performed, and
    the axis passes through the discharge port.

5. The refrigerator according to claim 2, wherein a maximum diameter of the opening is three to thirty five mm.

6. The refrigerator according to claim 2, further comprising a core material charged in the second space, wherein the core material comprises a concave portion formed around the opening.

7. The refrigerator according to claim 1, wherein a content of the second part of the adsorbent with respect to a total amount of the adsorbent is five percent to fifty percent by mass.

8. The refrigerator according to claim 1, wherein:
    the adsorbent is provided in a powder shape, and
    an average particle size of the adsorbent is 0.1 to 500 µm.

9. The refrigerator according to claim 1, wherein the adsorbent comprises a hydrogen adsorbent.

10. The refrigerator according to claim 9, wherein the hydrogen adsorbent is at least one selected from the group consisting of a palladium oxide (II), a zinc oxide, palladium, titanium, nickel, and magnesium, or a mixture thereof.

11. The refrigerator according to claim 1, wherein the adsorbent comprises a metal oxide having loss of oxygen.

12. The refrigerator according to claim 11, wherein the metal oxide comprises a titanium oxide or a cerium oxide.

13. The refrigerator according to claim 1, wherein the container is formed of a non-woven fabric made of a resin having oxygen gas permeability of 16 g/m2·24 h·atm or less.

14. A vacuum insulator comprising:
    an outer envelope;
    a container accommodated in the outer envelope; and
    an adsorbent configured to adsorb gas, wherein the adsorbent includes:
        a first part of the adsorbent existing in a first space formed with an inside surface of the container, and
        a second part of the adsorbent existing in a second space formed with an outside surface of the container and an inside surface of the outer envelope.

15. The vacuum insulator according to claim 14, wherein:
    the container comprises an opening through which the first space and the second space communicate with each other, and
    the second part of the adsorbent is dispersed into the second space around the opening.

16. The vacuum insulator according to claim 15, wherein:
    the opening comprises a plurality of openings respectively formed in two facing facets of the container, and
    an axis that passes through the plurality of openings exists.

17. The vacuum insulator according to claim 15, further comprising a core material charged in the second space, wherein the core material comprises a concave portion formed around the opening.

18. The vacuum insulator according to claim 16, wherein:
    the outer envelope comprises a discharge port through which vacuum discharge is performed, and
    the axis that passes through the discharge port exists.

* * * * *